Sept. 19, 1961 A. B. MAYFIELD 3,000,455
TRANSPORTING UNIT FOR HOUSE TRAILERS
Filed June 26, 1958 2 Sheets-Sheet 1
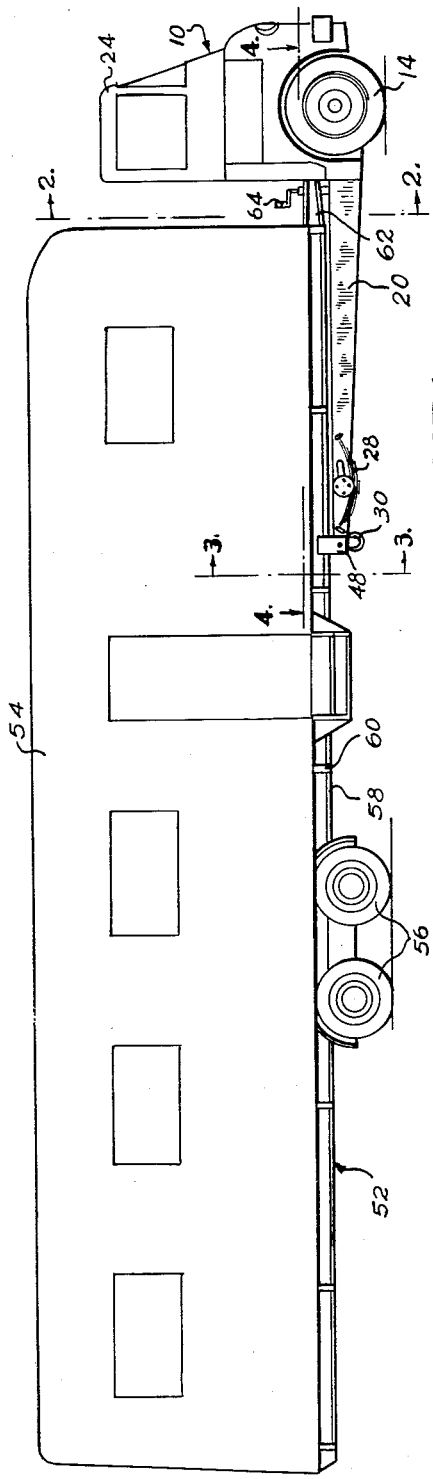
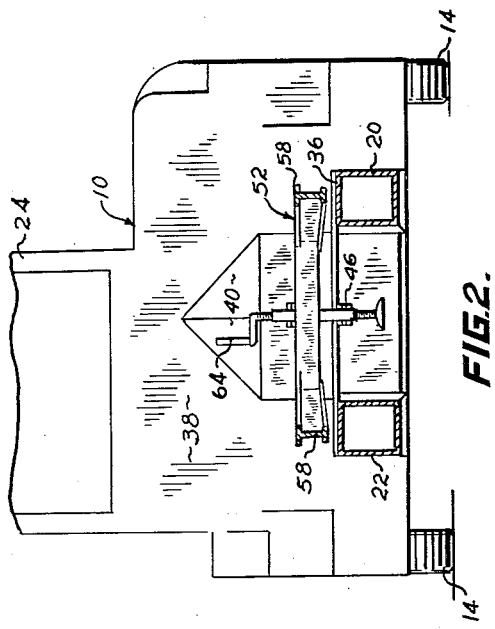
INVENTOR.
Alfred B. Mayfield
BY
ATTORNEY Sept. 19, 1961 A. B. MAYFIELD 3,000,455
TRANSPORTING UNIT FOR HOUSE TRAILERS
Filed June 26, 1958 2 Sheets-Sheet 2

INVENTOR.
Alfred B. Mayfield
BY
ATTORNEY

United States Patent Office 3,000,455
Patented Sept. 19, 1961

3,000,455
TRANSPORTING UNIT FOR HOUSE TRAILERS
Alfred B. Mayfield, Box 334, Halstead, Kans.
Filed June 26, 1958, Ser. No. 744,856
3 Claims. (Cl. 180—12)

This invention relates to the transportation of vehicles over the road from the point of manufacture or sale thereof to the point of distribution or use, and more particularly relates to a tractor unit for so transporting house trailers.

House trailers, after their manufacture or sale must, in many instances, be transported over long distances by the manufacturer or seller in order to deliver the trailers to the ultimate point of distribution or use. Furthermore, after the trailer has been delivered to its destination, the transporting unit must generally return to its point of origin in an empty condition.

Many efforts have been made to provide a unit which will satisfactorily transport a trailer to its destination and yet have the desired riding and driving characteristics when being returned empty. Such efforts have been hindered to an extent by the fact that many states closely regulate, by law, the over-all length of a tractor and trailer combination allowed on the highway. In view of this fact, and the increasing length of the trailer houses, numerous efforts have been made to shorten the tractor unit to the end that longer trailers might be moved over the road. Such efforts, while resulting in shorter tractors, have failed to provide such a tractor that will satisfactorily and safely transport a house trailer over long distances and which also has the desired riding and driving characteristics when being driven empty.

Accordingly, it is the primary object of the present invention to provide a tractor unit for transporting house trailers which will maintain the shortest possible over-all length of the tractor and trailer combination, and be interconnected with the trailer in such a manner as to form a single, unitary wheeled vehicle that may be safely driven over long distances.

It is a further object of the instant invention to provide a tractor unit for transporting house trailers which, when being driven empty, has excellent riding and driving characteristics due to the provision of an elongated frame supported by the wheels of the tractor unit at the front and rear thereof.

It is a further aim of this invention to provide a tractor unit having an elongated frame with a pair of removable primary rear wheels thereon as well as a pair of auxiliary rear wheels which allow the frame to be moved beneath the house trailer to be pulled and rigidly interconnected therewith.

Another object of the invention is to provide a rigidly interconnected tractor and trailer unit and thus create a unitary motor vehicle with a shortened over-all length wherein the possibility of the trailer swinging, swaying or jackknifing with respect to the tractor is eliminated as the combination is moved over the road or backed up.

Further objects of the invention will become apparent from the following specification, reference being made to the accompanying drawing wherein:

FIGURE 1 is a side elevational view of the tractor unit and trailer when interconnected;

FIG. 2 is an enlarged, fragmentary, cross-sectional view taken along line 2—2 of FIG. 1;

FIG. 3 is an enlarged, fragmentary, cross-sectional view taken along line 3—3 of FIG. 1;

Tractor unit 10 has a frame 12, which frame is supported at one end thereof by a pair of driving and steering wheels 14. Frame 12 carries at the forwardmost end thereof, in a conventional manner, a power plant 16 which is operably coupled with said wheels 14.

Figure 4:
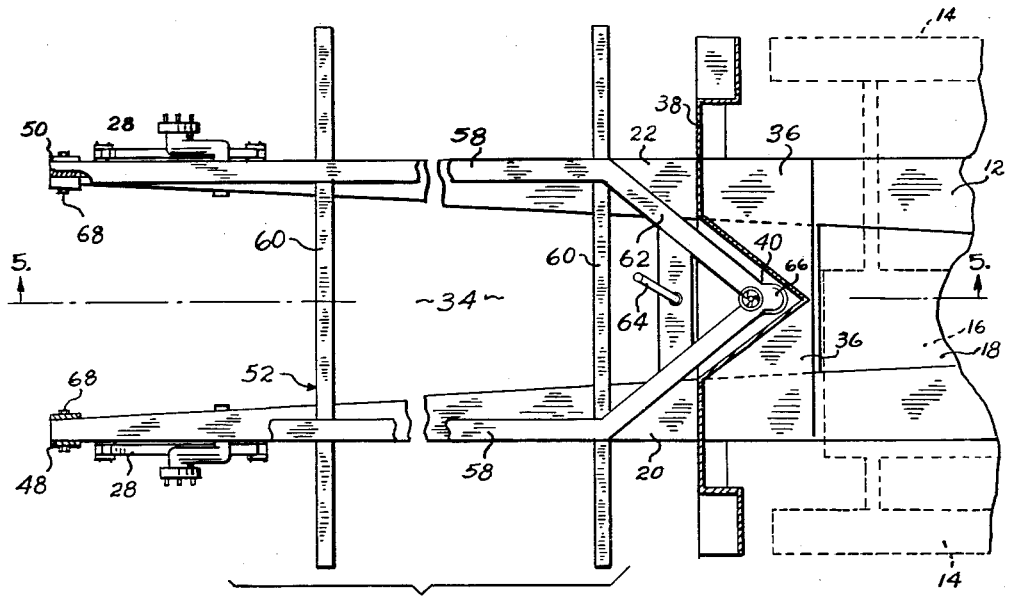
FIG. 4 is an enlarged, fragmentary, cross-sectional view taken on line 4—4 of FIG. 1.

As is evident from the drawing, particularly FIG. 4, frame 12 is substantially U-shaped whereby to present a bight 18 and a pair of normally rearwardly extending legs in the form of side beams 20 and 22. Bight portion 18 carries the above mentioned power plant 16 and is supported by wheels 14. A cab 24 is mounted on said frame 12, the cab 24 being located above bight 18 and the portions of beams 20 and 22 immediately to the rear of said bight 18.

Beams 20 and 22 extend rearwardly from bight 18 and from beneath cab 24 and are supported at the opposite ends thereof by a pair of primary rear wheels 26. Wheels 26 are suspended in the conventional manner by springs 28, each wheel 26 being independently mounted on its respective beams 20—22 and being detachable therefrom.

Carried by beams 20 and 22 to the rear of primary wheels 26 are a pair of auxiliary wheels 30 which are fixedly mounted on their respective beams 20—22 by suitable means such as members 32.

Figure 5:
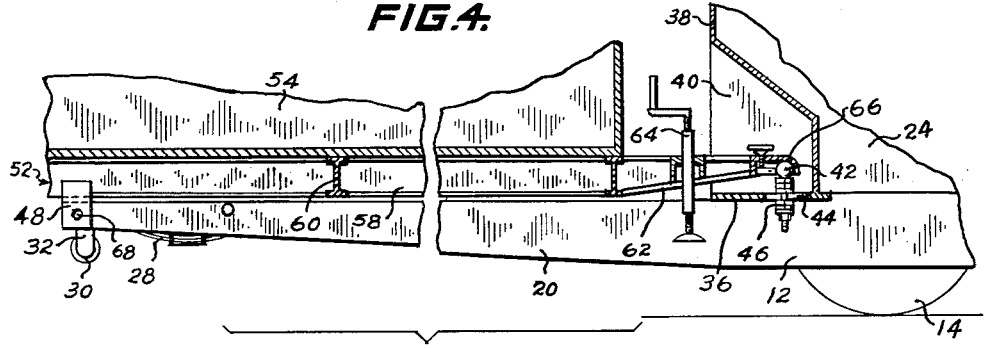
FIG. 5 is an enlarged, fragmentary, cross-sectional view taken on line 5—5 of FIG. 4.

Beams 20 and 22 which are spaced apart as best seen in FIGS. 2–4, are tapered toward the outermost ends thereof and are preferably made of a light, strong, material whereby beams 20 and 22 are capable of giving and flexing as unit 10 is driven over the road in combination with a trailer. Beams 20 and 22, due to their spaced apart relationship, form longitudinal opening 34 therebetween which has its innermost end at the rear of bight 18 beneath cab 24. Joining, and secured to, the upper surfaces of beams 20 and 22 at a point immediately to the rear of bight portion 18 is a plate 36, said plate 36 extending rearwardly to a line coplanar with the rear wall 38 of cab 24, as best seen in FIG. 5.

An inset 40 is provided in the rear wall 38 of cab 24 whereby access may be had to plate 36. Mounted upon plate 36 is a conventional socket-receiving ball 42, said ball 42 being horizontally adjustable within a slot 44 within plate 36 and vertically adjustable by means of a plurality of washers 46.

Thus it is seen that there is provided a cab over engine tractor unit 10 having an elongated, rearwardly extending frame 12, said frame being supported by a pair of front driving wheels 14 and a pair of primary rear wheels 26. The rearwardmost ends of beams 20 and 22 of frame 12 are provided with brackets 48 and 50 respectively, which brackets are adapted to interconnect beams 20 and 22 of frame 12 with the chassis 52 of a house trailer 54.

Trailer 54, as illustrated, is a conventional "mobile home," having a chassis 52, supported by wheel and axle assemblies 56, said chassis 52 being comprised of a pair of longitudinal I-beams 58 and a plurality of cross beams 60 joining said beams 58. Beams 58 extend beyond the front of trailer 54, the extending portions thereof being angled inwardly and joined whereby to provide a tongue 62. Tongue 62 is normally provided with a jack 64 as an integral part thereof as well as a socket 66 at the outermost end thereof, said socket 66 being adapted to engage a ball, such as 42.

Figure 6:
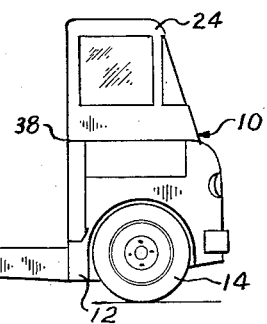
FIG. 6 is a side elevational view of the tractor unit entirely removed from the trailer and supported by its detachable rear wheels.

In operation, and in order to interconnect tractor unit 10 with trailer 54, unit 10, supported by wheels 14 and 26, as seen in FIG. 6, is positioned in front of trailer 54, the trailer 54 being independently supported by wheels 56 and jack 64 which would be in a lowered position whereby to space the front of the trailer 54 above the ground. Wheels 26 are then removed to prevent the same from interfering with the interconnection of unit 10 and trailer 54, thereby lowering beams 20 and 22 and allowing the rear end of frame 12 to be supported by auxiliary wheels 30, the front end of the unit 10 being supported by driving wheels 14.

With respective units so positioned, tractor 10 is moved rearwardly on wheels 14 and 30, allowing beams 20 and 22 to move beneath the forward portion of trailer 54. As unit 10 is moved rearwardly, jack 64 continues to support the front end of the trailer 54, the jack 64 being straddled by beams 20 and 22, and moving within opening 34. Thus, jack 64 does not interefere with the rearward movement of unit 10.

When unit 10 has been moved rearward to a position where socket 66 on tongue 62 is in a position above socket-receiving ball 42 the unit 10 is stopped, jack 64 raised, and the trailer 54 and unit 10 initially coupled by lowering socket 66 upon ball 42. Beams 20 and 22 are then raised by suitable means, such as placing a jack thereunder, and each of said beams 20 and 22 is interconnected with its adjacent I-beam 58 by means of brackets 48. If it is desired to move tractor 10 forwardly or rearwardly with respect to trailer 54, or to move backets 48 longitudinally of beams 58 for the purpose of avoiding conflict between wall 38 and the front of trailer 54, to secure a better connection between brackets 48 and beams 58, or to avoid cross beams 60, such may be accomplished by moving ball 42 within slot 44 as hereinbefore explained.

As best seen in FIG. 3, beams 20 and 22 are secured to their respective adjacent I-beams 58 by brackets 48 which clamp tightly about beams 58 and also embrace beams 20 and 22, being secured to the latter by bolts 68. When beams 20 and 22 are so interconnected with the chassis 52 of trailer 54 there are three points of connection between trailer 54 and unit 10, these being at the ends of each of beams 20 and 22 as above described and also at ball joint 42. Thus, trailer 54 is rigidly attached to unit 10 and a single long wheel base unit is created, the unit being supported by wheels 14 and 56.

Such a unit, in addition to creating the shortest possible over-all length in a tractor and trailer combination, offers several advantages over the usual tractor and trailer combination wherein the units are swingably joined by a fifth wheel assembly. As is evident from the instant invention, there is no possibility of trailer 54 jackknifing or swinging with respect to unit 10, thus eliminating many dangers when on the open road, as well as greatly facilitating the backing up of the tractor-trailer combination.

In addition to the advantages derived from the present combination, it is manifest that when the tractor unit 10 is being driven empty the elongated, flexible frame 12 will afford much better riding and driving characteristics than the conventional tractor when being driven at high speeds.

Tractor 10, therefore, takes advantage of the structural parts of a conventional trailer such as 54, it being seen that jack 64 as well as socket 66, chassis 52 and wheels 56 are used to advantage, and become an integral part of the present combination.

Having thus described the invention what is claimed as new and desired to be secured by Letters Patent is:

1. In combination with a house trailer having a chassis, supporting wheels, and a tongue extending from one end thereof, a tractor unit for transporting said trailer, said unit including a frame; a power plant mounted on said frame; a pair of front wheels supporting one end of the frame and operably connected with said power plant; a cab mounted on the frame, said frame including a pair of elongated, spaced apart tapered beams extending rearwardly from said cab and beneath said trailer when the trailer is being transported by the tractor; brackets rigidly interconnecting said chassis and said beams; a plate spanning the distance between said beams and secured to the latter; and a ball and socket joint secured to said plate and coupling the forward end of said tongue with said unit whereby to form a unitary vehicle.

2. A tractor unit for transporting house trailers, said unit comprising a frame; a power plant mounted on the frame; a pair of front driving and steering wheels supporting the frame below said power plant; a cab mounted on the frame; a pair of primary rear wheels supporting the frame; a pair of auxiliary wheels carried by the frame proximal to said primary wheels when the frame is supported by said primary wheels; and a socket-receiving ball supported by said frame beneath the cab for attachment to the front of a trailer, said frame being U-shaped whereby to present a bight and a pair of elongated legs, said bight being disposed beneath the cab and said legs extending rearwardly of said cab.

3. For wheeled house trailers of the kind normally supported at the forwardmost ends thereof by a towing vehicle, a tractor unit for transporting said trailers from a source of supply thereof to ultimate purchasers and users, said unit comprising an elongated frame having a front and rear wheel and axle assembly normally supporting the same; a power plant mounted on the frame adjacent the front assembly and having a driving connection with the latter, the wheels of the front assembly being steerable and the wheels of the rear assembly being detachable whereby to lower the rearmost end of the frame; and auxiliary wheels on the frame proximal to said rear wheel and axle assembly supporting the same upon detachment of said wheels of the rear assembly permitting backing of the unit into position where the frame underlies one of said trailers, permitting attachment of the latter to the frame, said auxiliary wheels being adapted for suspension out of engagement with the ground when the frame is attached to the trailer.

References Cited in the file of this patent

UNITED STATES PATENTS

| 1,155,713 | Eldridge | Oct. 5, 1915 |
| 1,228,306 | Evans | May 29, 1917 |
| 1,229,082 | Hollis | June 5, 1917 |
| 1,587,074 | Humphrey | June 1, 1926 |

FOREIGN PATENTS

| 252,986 | Germany | Oct. 30, 1912 |
| 599,711 | Germany | July 7, 1934 |